Dec. 9, 1969    A. K. ABU-AKEEL    3,482,654
BRAKE ASSEMBLY INCLUDING COUNTER ROTATING DISCS
Filed June 10, 1968    2 Sheets-Sheet 1

INVENTOR
ABDULHADI K. ABU-AKEEL
BY
William N. Antonio
ATTORNEY

United States Patent Office 3,482,654
Patented Dec. 9, 1969

3,482,654
BRAKE ASSEMBLY INCLUDING COUNTER ROTATING DISCS
Abdulhadi K. Abu-Akeel, South Bend, Ind., assignor to The Bendix Corporation, a corporation of Delaware
Filed June 10, 1968, Ser. No. 735,594
Int. Cl. F16d 55/224, 65/12
U.S. Cl. 188—72
9 Claims

ABSTRACT OF THE DISCLOSURE

The following relates to a high slip-speed geared wheel and brake assembly, for use on aircraft, which utilizes primary disc rotors carried by an aircraft wheel and secondary disc rotors carried by a common torque tube, wherein the primary and secondary rotors are interleaved to form a brake stack located between a non-rotatable axially movable pressure plate and a rotatable axially fixed backing plate. The torque tube is connected to the wheel through a gear train which causes the torque tube and secondary rotors to rotate in a direction opposite to the direction of rotation of the wheel and primary rotors.

BACKGROUND OF THE INVENTION

Conventional aircraft brakes have a set of rotating disc elements, usually referred to as rotors, which are suitably coupled to a rotating wheel of the aircraft. Braking is attained through friction when the rotors are pressed against another set of fixed disc elements, usually referred to as stators, which are coupled rigidly to a fixed axle. Either the rotors, or stators, or both, may be fitted or coated with some friction material to improve the mating friction characteristics. Braking pressure is applied by means of a set of fixed pressure cylinders and pistons, which apply a force against a pressure plate. The pressure plate, in turn, causes frictional engagement of the rotors and stators by forcing them against a fixed backing plate.

The braking torque in a wheel and brake assembly is a sum of the contribution of the friction forces at all rotor-stator mating interfaces. The torque from the stators is the reaction torque and is transmitted to the fixed parts, i.e., the axle.

The instantaneous braking torque will thus be:

$$T_B = a^n p \mu$$

where:

$T_B$ = braking torque;
$p$ = effective average pressure on the lining;
$n$ = number of rotor mating surfaces;
$a$ = constant that depends on the lining material, the effective radius of the friction surfaces and the area of the mating surface; and
$\mu$ = instantaneous coefficient of friction of the lining.

If the braking torque ($T_B$) determines the rate at which the moving vehicle is being decelerated, the rate of energy dissipation will thus be:

$$P = T_B \omega$$

where:

$P$ = the rate of energy dissipation; and
$\omega$ = instantaneous angular velocity of the wheel.

This is usually a design parameter of the brake and determines the rate at which heat is generated. It also depends on the rate of deceleration of the moving vehicle and its instantaneous speed.

The geared wheel and brake assembly, hereinafter described, makes use of the fact that the friction torque (T) can be reduced in proportion to any increase in angular velocity ($\omega$) provided the rate of energy dissipation (P) is the same, that is, remains constant. In other words, $$T\omega = P$$

The relationship between the friction torque (T) of the geared brake and the above defined braking torque ($T_B$) is:

$$T_B = T(1+R)$$

where R = the gear ratio between the wheel and secondary rotors.

Thus, the geared wheel and brake assembly, which is described hereafter in more detail, utilizes gearing to provide higher slip velocities and lower friction torque at the friction surfaces, while still maintaining the same braking torque at the wheel. In other words, if the slip velocity is increased, a given rate of energy dissipation can still be achieved, even though the normal braking pressure is decreased.

SUMMARY OF THE INVENTION

Accordingly, in view of the foregoing, it is an object of this invention to provide a wheel and brake assembly which provides the same braking torque as a comparable conventional brake by rotating the friction surfaces at slip speeds higher than in the conventional brake and by utilizing a normal braking pressure which is less than in the conventional brake.

Another object of this invention is to provide a wheel and brake assembly which utilizes gears to achieve opposite rotations and magnitude of relative angular velocity between the braking friction surfaces.

A further object of this invention is to provide a wheel and brake assembly which utilizes primary friction disc elements carried by and rotatable with the wheel, and secondary friction disc elements carried by and rotatable with the torque tube, wherein the primary and secondary friction disc elements are rotating in opposite directions and are interleaved to form a brake stack located between a pressure plate and a backing plate.

A still further object of this invention is to provide a wheel and brake assembly of the type described wherein the backing plate is coupled either to the wheel or torque tube and is rotatable therewith.

An important object of this invention is to provide a wheel and brake assembly of the type described which permits the use of low hydraulic braking pressure to achieve the same braking energy capacity as comparable conventional wheel and brake assemblies. Such use of lower normal braking pressure results, among other things, in reduced friction lining wear, longer lining life, and lower torque in most structural parts.

Another object of this invention is to provide a wheel and brake assembly of the type described which has improved dynamical performance characteristics because of the reduced friction torques, higher speeds and lower lining pressure.

A further object of this invention is to provide a wheel and brake assembly of the type described wherein the cost of operating same is substantially less than the operating costs of comparable conventional wheel and brake assemblies.

Other objects, features, and advantages of the invention will be apparent from the following description of the invention taken in connection with the accompanying drawings.

DESCRIPTION OF THE PREFERRED EMBODIMENTS

Figure 1:
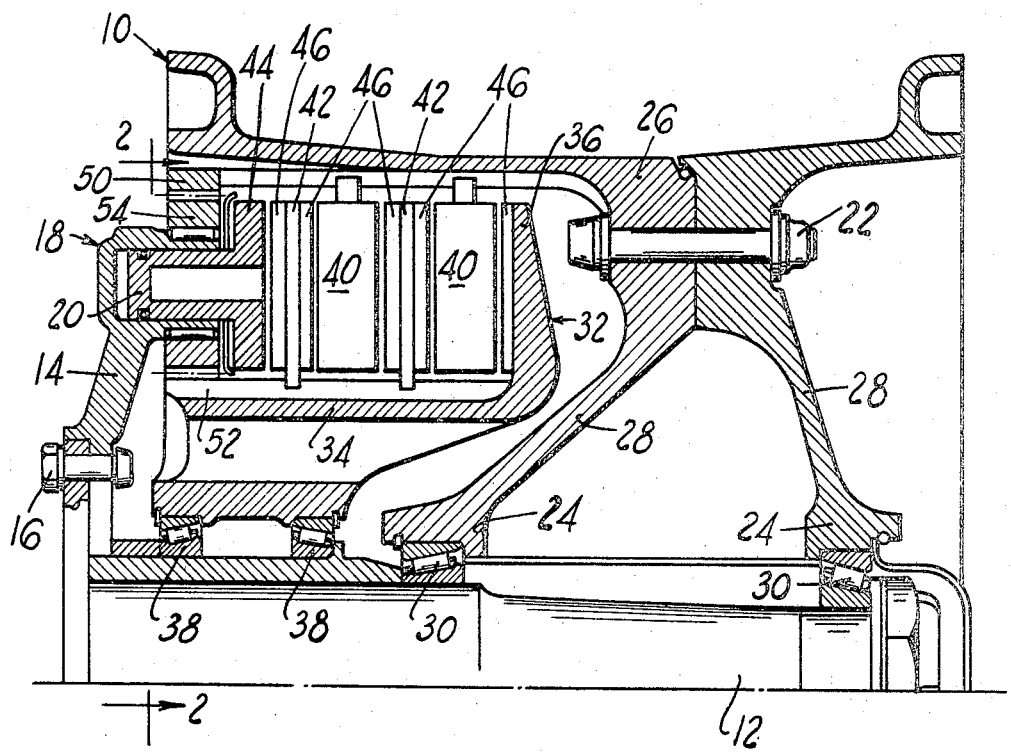
FIGURE 1 is a sectional view of a portion of a symmetrical wheel and brake assembly which incorporates the invention.
Figure 2:
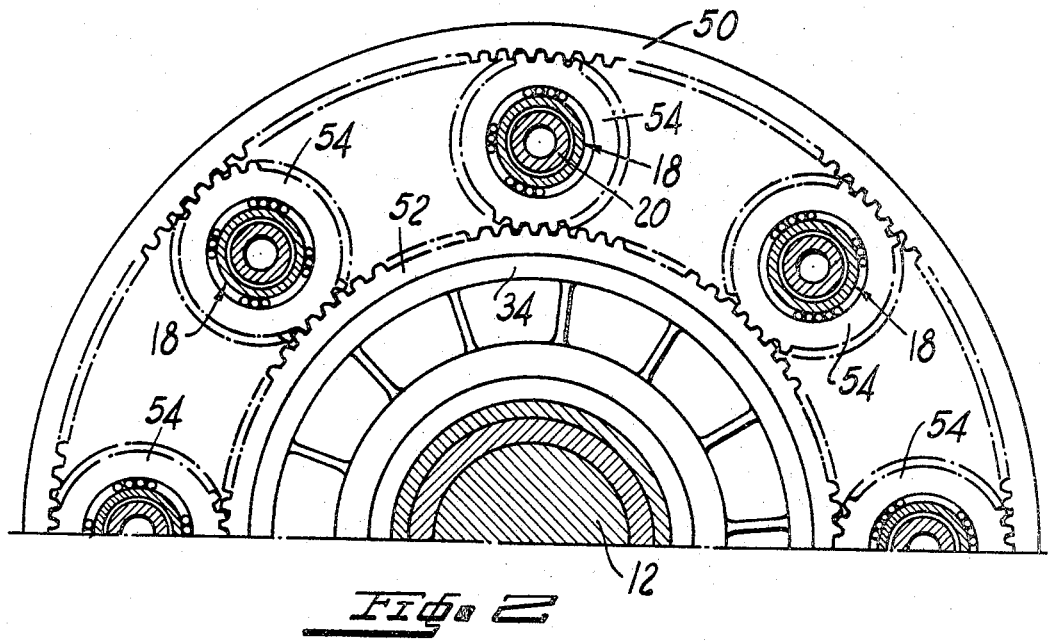
FIGURE 2 is a sectional view taken substantially along line 2—2 of FIGURE 1.

Referring to FIGURES 1 and 2, it will be seen that the wheel and brake assembly, which is illustrated, includes a wheel 10 rotatably mounted on a stationary axle 12, and a stationary carrier member 14 which is connected to the axle through any suitable means, such as by a plurality of direct bolt connections 16. The carrier contains a plurality of fluid motors 18, each of which includes a piston 20 located and slidable therein. The fluid motors may be of any conventional construction provided with suitable heat shielding and proper load transfer or fluid sealing means. The wheel 10, which is formed of two sections fastened together by a plurality of bolts 22, includes a hub portion 24 and a rim portion 26 interconnected by a plurality of spokes 28. The wheel 10 is rotatably mounted on the axle through suitable means, such as bearings 30 which are located between the wheel hub portion 24 and the axle. A torque tube 32, which includes a sleeve portion 34 and an annular backing plate flange 36, is, likewise, rotatably mounted on the axle 12 through suitable means, such as bearings 38.

The brake, which is illustrated, is of the disc type and includes a plurality of primary rotors 40, which are suitably splined to and are rotated by the aircraft wheel 10, and a plurality of secondary rotors 42, which are suitably splined to and are rotated by the sleeve 34 of the torque tube 32 in a manner more specifically described hereinafter. The primary and secondary rotors can be of any suitable conventional construction, or can be of the floating heat sink core constructions, which are disclosed and claimed in my copending applications Ser. No. 735,592 and Ser. No. 735,593. Both the primary and secondary rotors are movable axially and are sometimes referred to as a brake stack. It is the frictional engagement of these oppositely rotatable primary and secondary rotors which produces the desired braking action on the aircraft wheel. A pressure plate 44, which is suitably attached to the pistons 20 of the fluid motors 18, forces the primary and secondary rotors against each other upon actuation of the motors by thrusting at one side of the brake stack and biasing the entire stack against the backing plate 36. Although, only the secondary rotors 42 and backing plate 36 are shown with friction lining material 46 attached thereto, if desired suitable lining material could also be attached to the pressure plate 44 and the primary rotors 40.

In order to rotate the torque tube 32 and the secondary rotors 42 in a direction opposite to the direction of rotation of the wheel 10 and primary rotors 40, a gear train is interposed between the wheel and the sleeve 34 of the torque tube. The gear train includes an annular internal driver gear 50 carried by the wheel, an annular external driven gear 52 carried by the torque tube, and a plurality of idler gears 54, each of which is carried by and revolves around one of the fluid motors 18 or axles fixed to the carrier on suitable bearings. The annular gears can be fixed or torsionally coupled to the wheel or torque tube by means of keys, screws, splines, or any other suitable means of coupling. The idler gears, which in effect rotate on fixed axles on the brake carrier, provide the necessary direction reversal of motion between the wheel and the torque tube. It will be understood that, if desired, the gears may be suitably heat shielded, enclosed, and provided with proper lubrication means. In addition, although not shown, other additional features found in conventional brakes, such as return springs, wear adjusters, wear indicators, etc., in various arrangements, could be also included, as desired.

Figure 3:
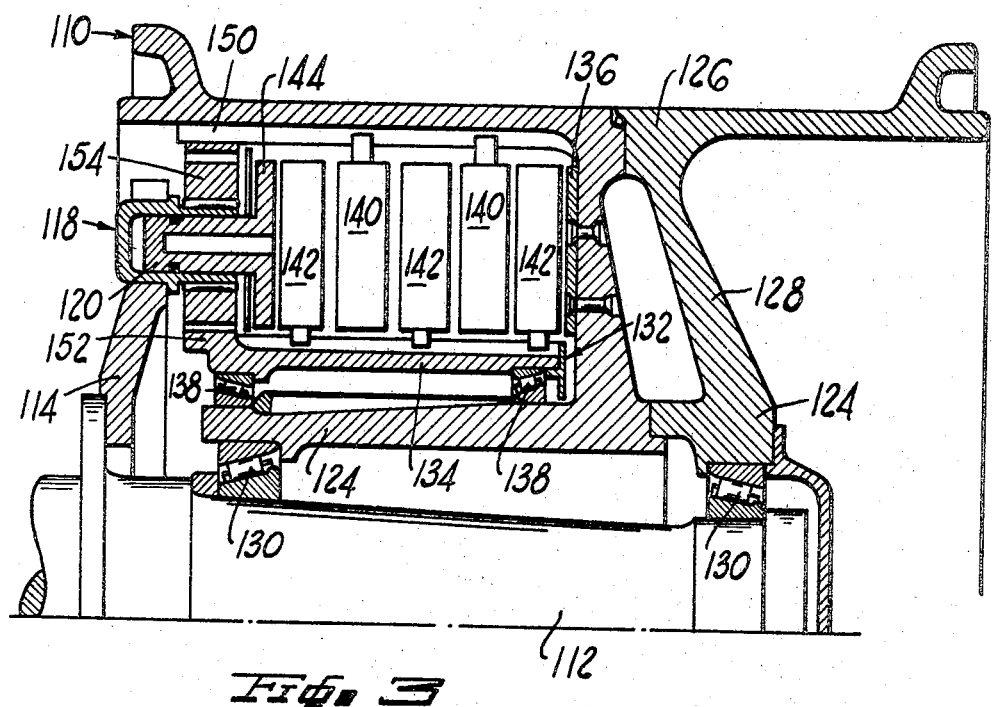
FIGURE 3 is a sectional view similar to that of FIGURE 1 showing another embodiment of the invention.

Although in FIGURE 1, the rotatable backing plate 36 is shown as being rigidly coupled to the torque tube, as in most conventional disc brakes, it can also be rigidly coupled to or formed as a part of the supporting wheel web structure, as shown in FIGURE 3. In FIGURE 3, like parts are designated by like numerals plus 100. Thus in FIGURE 1, the backing plate 36 is in effect a secondary rotor, whereas in FIGURE 3, the backing plate 136 is in effect a primary rotor. It will also be noted in the construction of FIGURE 3 that the torque tube 132 is rotatably mounted on the wheel hub 124 through suitable bearings 138. Accordingly, it will be seen from the drawings that although the backing plate can be formed as part of the torque tube, as shown in FIGURE 1, to make the brake self-reacting, the construction of FIGURE 3, wherein the wheel is utilized as the backing plate, reduces the complexity of the design and relieves the torque tube from any axial loads. The FIGURE 3 construction also provides a weight saving which is advantageous in that it more than counterbalances the added weight of the gear train.

From the foregoing it will be readily apparent that the herein described gear brake makes use of the fact that the friction torque can be reduced in proportion to any increase in angular velocity provided the rate of energy dissipation is the same. This is achieved by driving a set of secondary rotors in a direction opposite to the direction of rotation of the wheel and the primary rotors by utilizing a suitable gear train. In the disclosed embodiments the idler gears provide the necessary reversal of direction. The reaction torque is transmitted to the fixed axle through means of the fixed carrier member which carries the idler gears and the pressure cylinders which act on the non-rotatable but axially movable pressure plate. This plate, as can be seen from the drawings can act against either a primary or a secondary rotor.

The many advantages of utilizing oppositely rotatable interleaved primary and secondary rotors and suitable gearing to provide higher slip velocities and lower friction torque at the friction surfaces, while still maintainng the desired braking torque at the wheel should be readily apparent to those skilled in the art.

Furthermore, although this invention has been described in connection with certain specific embodiments, it will be obvious to those skilled in the art that various changes may be made in the form, structure, and arrangement of components without departing from the spirit of the invention. In addition it will be apparent that, although this invention has been described in connection with an aircraft, it can also be utilized on other moving vehicles or machines that require friction braking. Accordingly, I do not desire to be limited to the specific embodiments disclosed herein.

Having thus described the various features of the invention, what I claim as new and desire to secure by Letters Patent is:

1. A wheel and brake assembly comprising fixed mounting means, a wheel member operatively connected to said fixed mounting means and rotatable with respect thereto, a torque-taking member operatively connected to said fixed mounting means and rotatable with respect thereto, a backing plate fixedly connected to one of said members and rotatable therewith, a plurality of primary friction disc elements carried by said wheel and rotatable therewith, a plurality of secondary friction disc elements carried by said torque-taking member and rotatable therewith, said primary and secondary friction disc elements being rotatable about a common axis and interleaved to form an axially movable brake stack, force transmitting means including a pressure plate operatively connected to said fixed mounting means for urging said brake stack against said backing plate and causing frictional engagement between adjacent disc elements, and drive means operatively connected to said torque-taking member and said wheel member for causing rotation of said torque-taking member and said secondary friction disc elements in a direction opposite to the direction of rotation of said wheel member and said primary friction disc elements.

2. A wheel and brake assembly comprising fixed mounting means, a wheel operatively connected to said fixed mounting means and rotatable with respect thereto, torque-taking means operatively connected to said fixed mounting means and rotatable with respect thereto, first braking means carried by said wheel and rotatable therewith, said first braking means including a plurality of rotatable axially movable primary friction disc elements, second braking means carried by said torque-taking means and rotatable therewith, said second braking means including a plurality of oppositely rotatable axially movable secondary friction disc elements interleaved between said primary disc elements, said primary and secondary friction disc elements being adapted for frictional interengagement, a rotatable axially fixed backing member included as part of one of said braking means, force transmitting means including a plurality of fluid motors operatively connected to said fixed mounting means for causing frictional engagement between said first and second braking means, said primary and secondary disc elements being located between said force transmitting means and said backing member, and drive means including a gear train operatively connected to said wheel and torque-taking means for causing said secondary friction disc elements to rotate in a direction opposite to the direction of rotation of said primary friction disc elements, said gear train including an annular internal gear carried by said wheel, an annular external gear carried by said torque-taking means, and idler gear means carried by said fixed mounting means for meshing with said annular internal and external gears, said idler gear means including a plurality of idler gears each of which is carried by and revolves about one of said fluid motors.

3. A wheel and brake assembly comprising fixed mounting means, a wheel operatively connected to said fixed mounting means and rotatable with respect thereto, torque-taking means operatively connected to said fixed mounting means and rotatable with respect thereto, first disc means carried by said wheel and rotatable therewith, second disc means carried by said torque-taking means and rotatable therewith, drive means including a gear train operatively connected to said torque-taking means and said wheel for continuously causing rotation of said torque-taking means and said second disc means in a direction opposite to the direction of rotation of said wheel and said first disc means, a plurality of force-transmitting means operatively connected to said fixed mounting means for causing frictional engagement between said first and second disc means, said gear train including idler gear means rotatably mounted on each of said force transmitting means.

4. The structure, as defined in claim 3, wherein said gear train includes an annular internal gear carried by said wheel, and an annular external gear carried by said torque-taking means, each of which meshes with said idler gear means.

5. The structure, as defined in claim 3, wherein one of said disc means includes a rotatable axially fixed backing member.

6. The structure, as defined in claim 5, wherein the other of said disc means is located between said force transmitting means and said backing member, said friction disc means being adapted to move axially into frictional engagement with said backing member upon the exertion of a force thereagainst by said force transmitting means.

7. The structure, as defined in claim 3, wherein said wheel is mounted for rotation on a portion of said fixed mounting means.

8. The structure, as defined in claim 7, wherein said torque-taking means is mounted for rotation on a portion of said fixed mounting means.

9. The structure, as defined in claim 7, wherein said torque-taking means is mounted for rotation on a portion of said wheel.

References Cited
UNITED STATES PATENTS

| | | | |
|---|---|---|---|
| 2,128,013 | 8/1938 | Parnell | 188—80 X |
| 2,593,045 | 4/1952 | Maroshick | 188—80 X |
| 2,760,736 | 8/1956 | Mihalko et al. | 188—71 X |
| 3,101,813 | 8/1963 | Parrett | 188—725 |

GEORGE E. A. HALVOSA, Primary Examiner

U.S. Cl. X.R.

180—80; 192—20, 70.16